Dec. 31, 1968  I. H. LEACH  3,419,648
METHOD OF MOLDING POLYSTYRENE
Filed Aug. 18, 1965

INVENTOR.
IRBY H. LEACH
BY
*William D. Miller*
ATTORNEY

Dec. 31, 1968   I. H. LEACH   3,419,648
METHOD OF MOLDING POLYSTYRENE
Filed Aug. 18, 1965
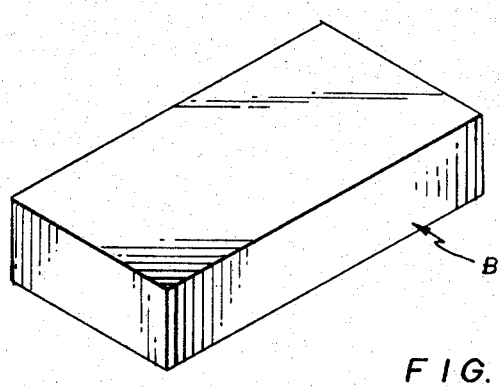
FIG. 7
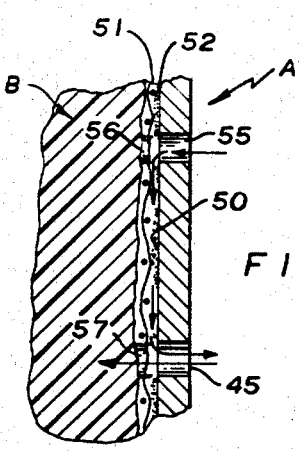
FIG. 5
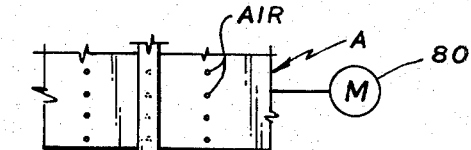
FIG. 6
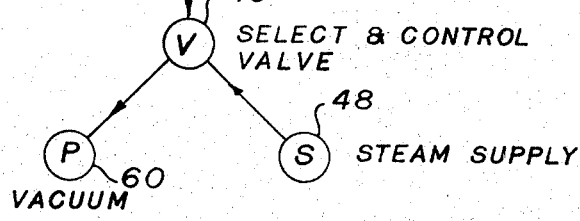
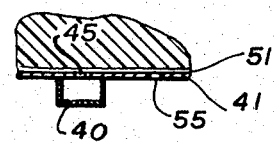
FIG. 4
FIG. 3
INVENTOR.
IRBY H. LEACH
BY William D. Miller
ATTORNEY

United States Patent Office 3,419,648
Patented Dec. 31, 1968

3,419,648
METHOD OF MOLDING POLYSTYRENE
Irby H. Leach, Napa, Calif., assignor, by mesne assignments, to The Dow Chemical Company, Midland, Mich., a corporation of Delaware
Filed Aug. 18, 1965, Ser. No. 480,712
5 Claims. (Cl. 264—53)

ABSTRACT OF THE DISCLOSURE

Expandable beads such as polystyrene are molded by steam employing pressure of the beads on the mold. Steam pressure is lowered and the molding cooled by drawing air through the steam system from openings in a fabric lined mold.

---

This invention relates to a method for molding foamable thermoplastic materials such as polystyrene. Foamable polystyrene is normally formed in small granules which, when confronted with heat, will expand to many times their normal size. When the expansion occurs within a closed mold, the individual expanded granules of polystyrene press against the mold walls producing a molded article having the desired shape.

One of the methods commonly used to heat and foam the thermoplastic granules is the injection of steam within a mold cavity containing pre-expanded granules of a polymer such as polystyrene. The steam imparts direct heat to the polystyrene granules causing them to expand to the desired shape. Thereafter the molded material is cooled, generally by applying a coolant to the exterior of the mold. One of the characteristics of expanded polystyrene products is its excellent thermo-insulating property. Therefore, cooling of the expanded body of necessity has required a considerable time lag generally requiring an interval of twenty minutes or so for the cooling operation to take place before the molded product can be removed from the mold.

The present invention incorporates a new means for cooling the molded product after expansion by maintaining a vacuum across the face of the mold to accomplish the cooling cycle. The presence of the vacuum causes the condensed water from the steam injection to be drawn from the molded product. At the same time, air is purged through the mold to assist in dewatering the molded object. The vaporization of the steam condensate removes heat from the mold rapidly so that the product can be removed from the mold sooner than normally would have been possible. This process removes condensate from the interstices, thereby cooling the molded product uniformly and effecting a significant reduction in the water content of the molded object.

A feature and advantage of this invention lies in the fact that the molded product can be removed from the mold without the necessity of cooling the mold body because the cooling occurs by substantially adiabatic expansion and vaporization within the mold rather than by heat transfer through the mold body. This is extremely important in reducing the cycle time in sequential operations due to the fact that the mold body can be retained at relatively high temperatures and need not be substantially re-heated for subsequent molding operations. Thus, in the present invention the molded product is removable from the mold in substantially less time than was heretofore possible, and, moreover, the mold is retained at near molding temperature so that expansion of the next molded product can occur at a more rapid rate than heretofore possible.

One of the objects of the present invention is to provide a novel foraminous layer on the mold surface which has sufficient hardness to withstand the pressure of the expanded polystyrene without collapse and which further provides air passageways over the surfaces of the molded product through which air can be circulated.

A further feature and advantage of this invention lies in the fact that the foraminous layer of material on the mold face thermally insulates the expanded product from the mold body. By this means the fibers form a thermal insulator between the hot mold and the cooling molded product to minimize heat exchange between the two bodies during the cooling cycle.

Another object of this invention is to provide a method of expanding polystyrene or other foamable thermoplastic material within a mold in which the injected steam is maintained at full expansion velocity until such time as the pressure of the molded product against the mold is approximately twice that desired in the end product. Thereafter the steam pressure is reduced to a level sufficient to cause the pressure of the product against the mold wall to drop to its desired level. The aforesaid method causes a greater migration of the liquid content within the molded product to be directed outwardly towards the surface of the mold than is otherwise obtainable. With this novel apparatus and method a greater percentage of the steam condensate in the molded product is vaporized to cool the product when vacuum and air purge are applied. Also, the end product has a lower water content and a better density ratio. It has been found, for example, that end products formed with the aforesaid steps have a density at the center of the molded product which is substantially less than the density at the peripheral portion of the product.

Other objects, features and advantages of the present invention will be more apparent after referring to the following specification and attached drawings in which:

FIG. 3 is a fragmentary portion of the inside surface of the mold showing in broken lines the position of fluid inlet and exhaust manifolds;

FIG. 4 is a cross-sectional view of typical air inlet ports and fluid inlet and exhaust manifolds on the mold face;

FIG. 5 is a fragmentary enlarged view showing the foraminous liner separating the molded products from the mold face and the fluid passageway between ports through the foraminous liner;

FIG. 6 is a schematic view showing the flow of steam and vacuum pressures to the mold; and FIG. 7 is a perspective view showing the final molded product as would be derived from the mold as shown in FIGS. 1 and 2.

Figure 1:
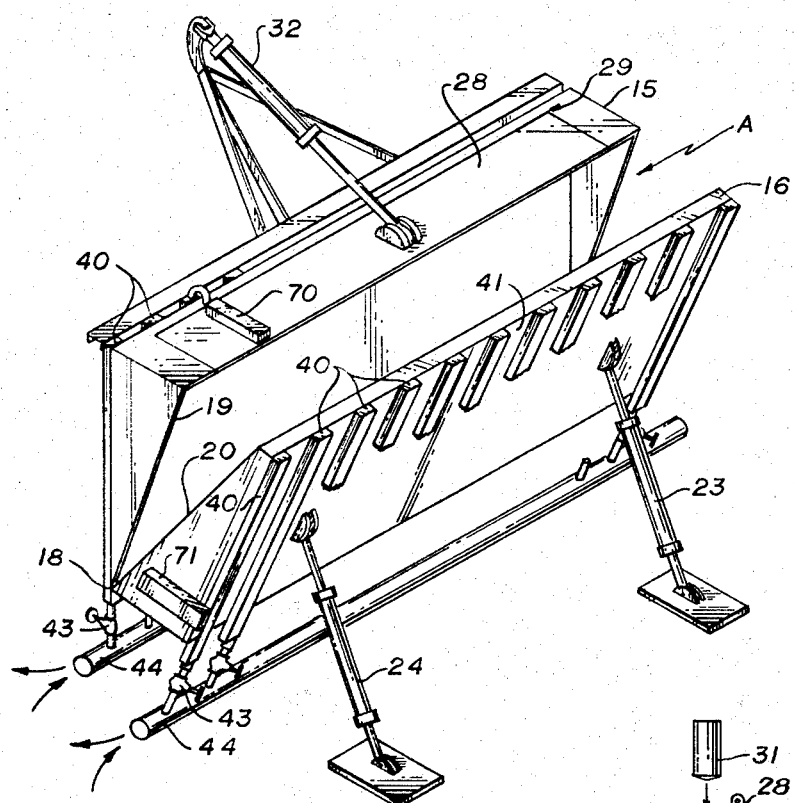
FIG. 1 is a perspective view of molding apparatus suitable for use in the present invention.
Figure 2:
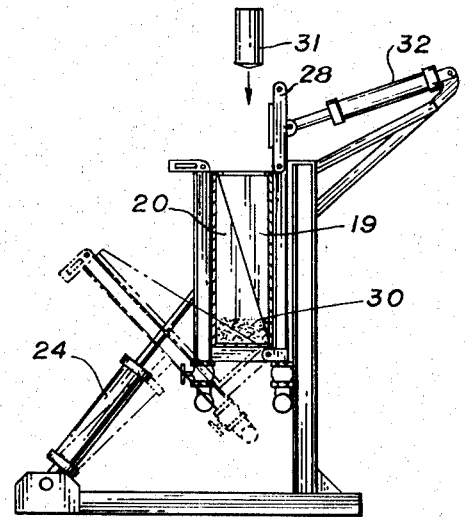
FIG. 2 is a cross-sectional view of the mold of FIG. 1.

Referring now to the drawings there is provided in FIGS. 1 and 2 a mold shown for illustrative purposes only which incorporates the present invention. Mold A comprises a housing arranged in two half sections 15 and 16 pivotally connected at 18 for movement to a closed position defining an enclosed rectangular cavity in which a molded block or product B (as seen in FIG. 7) can be formed. The side walls of half sections 15 and 16 are diagonally cut at 19 and 20 to provide a wide top area when the two half sections 15 and 16 are in their opened position. The wide opening is for convenience in removing molded block B. Pneumatic cylinders 23 and 24 are provided to close and open the mold. Top door or panel 28 is hinged at 29 in order to open upwardly to form an area into which foamable thermoplastic particles 30 can be metered from a particle metering apparatus 31. A hydraulic motor 32 is arranged to effect the opening or closing of the door or panel 28.

The mold as above described is one of many conventional designs and is shown for illustrative purposes to establish an environment in which the present invention is applicable. In the present invention a plurality of steam manifolds 40 are mounted on the outer face 41 of the mold on both sections 15 and 16. Each of the steam manifolds is connected through a valve 43 to a steam header 44. As can be seen with particular reference to FIGS. 3 and 4 the steam manifolds are arranged with fluid passageways through face 41 via spaced steam apertures 45. Headers 44 are arranged to be supplied with steam under pressure from a steam supply 48 as indicated schematically in FIG. 6 controlled by a master valve 49 and subsequent entry into steam headers 44 and steam manifolds 40. The steam in turn is allowed ingress into the mold cavity through steam apertures 45.

The entire inside surface 50 of the mold cavity of mold A is covered by mat 51 of woven glass fibers which is adhered to mold face 50 by a resin or other binder material 52 of sufficient density to cause adherence of glass fiber mat 51 to mold face 50 without filling the spaces between the fibers and impermeabilizing the mat. Epoxy resins have been found to be particularly suitable for this purpose. Panel 41 is also formed with a plurality of air inlet apertures 55 best suited at equally spaced intervals from the respective apertures 45. Glass fiber matting 51 is similarly formed with apertures through it at 56 and 57 aligned with apertures 55 and 45, respectively. A vacuum pump 60 is arranged in fluid communication with valve 49 and therefrom in fluid communication with steam headers 44 and therefrom to the respective steam manifolds 40. Valve 49 is arranged to selectively switch the communication of headers 44 to either vacuum pump 60 or steam supply 48.

The operation of the mold can be understood by referring to FIG. 2. With the two half sections 15 and 16 of mold A in the closed position and door 28 in the open position, particles 30 of a foamable thermoplastic such as polystyrene are discharged into the mold by metering device 31. After closing door 28, control valve 49 is operated to admit steam from supply 48 into the mold via steam headers 44, manifolds 40 and apertures 45. The steam heats the particles 30 causing them to expand and exert pressure on the walls of the mold. The individual granules become agglomerated into a cellular body owing to the pressure between the particles at this elevated temperature where the thermoplastic particles are cohesive. The steam level is controlled by valve 49 to regulate volume in accordance with the method of control as will be hereinafter explained.

When the molded product B has expanded the desired amount, valve 49 is then reversed to cause pump 60 to draw from manifolds 40. This in turn causes air to enter the mold through the air input apertures 55 and flow through permeable matting 51 and out manifold apertures 45, sweeping condensate and water vapors out of the mold. This evacuation of the steam and condensate from the mold produces rapid cooling of the polymer to a temperature below its heat distortion temperature.

The vacuum pressure employed in steam headers 44 is regulated to provide approximately 5 to 10 inches of mercury pressure along the interfaces between apertures 55 and 45 to evaporate the water residual from the steam injection heating of the polymer. It has been found that if the vacuum is too great there can be a tendency for the molded product to collapse. On the other hand, if the pressure gradient is greater than 10 inches of mercury there is a waste of forces without any concurrent superiority of results.

It is noted that the glass fiber mat is formed of sufficient structural rigidity so that it can withstand the pressure of the expanded molded product B (which is usually within the range of 11 to 25 pounds per square inch) without collapsing, so that the air passageways between fibers are maintained. The thin layer formed by the glass fiber mat thus functions both as a mold face and a fluid conduit to carry the air across the face. It can be seen that the heat of vaporization accompanying the water removal effects rapid cooling of the face of mold product B. At the same time it can be seen that with adiabatic expansion it is not necessary that the mold face 41 be cooled. It has been found that a molded product can be cooled for removal from the mold in as short a period as two or three minutes where heretofore other methods required as much as twenty minutes for a molded product having a similar size. Molded product B is removed from mold A when the temperature of the molded product B has dropped to a sufficiently low temperature to allow its removal.

While in the description of mold A, steam manifolds 40 have been shown predominantly only on the major face 41 it is desirable to include manifolds along the side, top and bottom walls as indicated at 70 and 71 to obtain a more uniform distribution of steam and vacuum to the mold. The permeable mat 51 has been described as being composed of woven glass fibers. However, it should be understood that numerous other foraminous materials can be employed to line the mold. The essential characteristic of these materials is that they must maintain channels of fluid communication over the face of the expanded product between the air inlet and the air outlet apertures under the influence of the pressure generated by the expanded polymer. Such materials may include sintered metals or matted fibers or other porous but physically rigid materials. It is important for convenient operation of the equipment that the face of the foraminous material does not bond tightly to the molded product. To this extent glass fiber has proven to be a preferable material.

It is further noted that improved products can be developed by controlling valve 49 during the steam inlet phase of the molding cycle. This is accomplished by metering the pressure exerted by expanded product B via a pressure meter 80 mounted to measure the pressure of the polystyrene against the mold wall. Steam is directed at high volume through valve 49 into the mold chamber until the pressure of the molded product B against the mold wall is approximately twice the desired end product pressure. Thereafter, valve 49 is partially closed to reduce the volume of steam flow into the cavity and allow the pressure to decline to a level equal to the desired end or termination pressure. This sequence of operation causes expansion of the polymer from the center of the molded product outwardly which results in a product having a greater peripheral density than appears at the center. At the same time the migration of pressure from the center outwardly drives the water towards the peripheral area of the molded product, thus allowing for a more rapid rate of cooling by virtue of the low air pressure at matting 51 during evacuation. It has been found, for example, that in molding panels of polystyrene material, wherein an end pressure against the mold of 11 pounds per square inch is desired, the maintenance of high pressure steam flow until the pressure reaches 25 pounds per square inch is desirable. Thereafter, the steam flow is reduced until the pressure of the molded product against the mold face drops to about 11 pounds per square inch. Finally, the vacuum is applied for cooling and subsequently the mold is opened and the product removed.

While the specification has described the invention with particular reference to polystyrene, the invention is not intended to be so limited but can be practiced with various foamable thermoplastic materials which expand to produce a cellular product when subjected to an elevated temperature. The process can be used to mold cellular products from polystyrene, polyvinyl chloride, copolymers of vinyl and vinylidene chloride, polyacrylic esters, polymethacrylic esters, copolymers of styrene and methyl methacrylate, copolymers of styrene and acrylonitrile or copolymers of styrene and natural or a synthetic rubber. Thermoplastic resinous polymers and copolymers of alkenyl aromatic compounds of the benzene series are particularly suitable. Examples of such alkenyl aromatic resins are the solid homopolymers of styrene, vinyltoluene, vinylxylene, ar-ethylvinylbenzene, isopropylstyrene, tert.-butylstyrene, ar-chlorostyrene, ar-dichlorostyrene, ar-fluorostyrene, ar-bromostyrene, the solid copolymers of two or more of such monovinyl aromatic compounds and solid copolymers of one or more of such monovinyl aromatic compounds and minor amounts, e.g. from 1 to 30 percent by weight, of other readily copolymerizable olefinic compounds such as acrylonitrile, methyl methacrylate or ethyl acrylate.

The polymers can be made foamable by incorporating a raising agent. This can be accomplished either by polymerizing the monomer in the presence of the raising agent or by impregnating the polymer granules with the foaming agent under pressure. Suitable foaming agents are volatile organic fluids such as the saturated aliphatic hydrocarbons containing from 4 to 7 carbon atoms in the molecule such as butane, pentane, hexane, heptane, cyclohexane and the perchlorofluorohydrocarbons such as dichlorodifluoromethane, trichlorofluoromethane, monochlorotrifluoromethane, tetrachlorodifluoroethane, dichlorotetrafluoroethane or monochloropentafluoroethane. The foamable polymer typically contains from about 3 to about 25 percent by weight of the foaming agent.

It is frequently desirable to use polymer granules which have been partially expanded before they are metered into the mold. Such prefoamed beads or granules are obtained by heating the polymer granules containing a blowing agent to a temperature above its softening point and above the boiling point of the foaming agent.

While several embodiments of the present invention have been shown and described it will be obvious that other adaptations and modifications may be made without departing from the true spirit and scope of the invention.

I claim:
1. The method of molding cellular plastic objects from foamable polymer granules comprising:
   metering a quantity of foamable polymer granules into a closed mold;
   injecting steam into said mold at a plurality of locations to heat and expand said polymer granules until the expanded granules exert a predetermined pressure against the walls of said mold;
   then rapidly cooling and drying the cellular plastic object by applying a vacuum to said mold and drawing air into said mold to vaporize steam condensate therein and sweep water vapor and steam condensate therefrom.

2. The method of claim 1 wherein said air is admitted to said mold at a plurality of locations which are at substantially equally spaced intervals relative to the locations of steam injection.

3. The method of claim 1 wherein said steam is first injected at a rate which produces a first predetermined pressure in said mold then the steam injection rate is reduced to obtain a lower predetermined pressure in said mold.

4. The method of claim 1 wherein said foamable polymer granules are partially expanded before they are metered into said mold.

5. The method of claim 3 wherein said polymer is polystyrene, said first mold pressure is about 25 pounds per square inch and said lower mold pressure is about 11 pounds per square inch.

References Cited

UNITED STATES PATENTS 3,161,912   12/1964   Wiles _____ 264—53
3,097,397   7/1963    Leach et al.

OTHER REFERENCES

Technical Manual: "Dylite" Expandable Polystyrene, Koppers Co., Mold Techniques and Mold Design, Bulletin G9–273, Chapter 3e, Nov. 15, 1959 (pp. relied on 20–21).

JULIUS FROME, Primary Examiner.

L. M. GARRETT, Assistant Examiner.

U.S. Cl. X.R.

18—5; 264—51